United States Patent
Cho et al.

(10) Patent No.: US 11,036,843 B2
(45) Date of Patent: Jun. 15, 2021

(54) BIOMETRIC INFORMATION-BASED AUTHENTICATION METHOD AND APPARATUS

(71) Applicant: ELECTRONICS AND TELECOMMUNICATIONS RESEARCH INSTITUTE, Daejeon (KR)

(72) Inventors: Kwan Tae Cho, Daejeon (KR); Ju Young Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 193 days.

(21) Appl. No.: 16/200,032

(22) Filed: Nov. 26, 2018

(65) Prior Publication Data
US 2019/0163890 A1 May 30, 2019

(30) Foreign Application Priority Data

Nov. 24, 2017 (KR) .................. 10-2017-0158235
Nov. 26, 2018 (KR) .................. 10-2018-0147679

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/40* (2013.01); *G06K 9/6217* (2013.01)

(58) Field of Classification Search
CPC ........ G06F 21/32; G06F 21/40; G06K 9/6217
See application file for complete search history.

(56) References Cited

U.S. PATENT DOCUMENTS

| 10,020,933 | B2 * | 7/2018 | Yasuda | ................. | H04L 9/14 |
| 2011/0099385 | A1 * | 4/2011 | Takahashi | ........... | H04L 63/0861 |
| | | | | | 713/186 |

(Continued)

FOREIGN PATENT DOCUMENTS

| KR | 10-1270954 B1 | 6/2013 |
| KR | 10-1275590 B1 | 6/2013 |
| KR | 10-1743103 B1 | 6/2017 |

*Primary Examiner* — Jeffrey C Pwu
*Assistant Examiner* — Rodman Alexander Mahmoudi
(74) *Attorney, Agent, or Firm* — Rabin & Berdo, P.C.

(57) ABSTRACT

Disclosed is a biometric information-based authentication method and apparatus, in which various types of biometric information extracted from a user are used. According to an embodiment of the present disclosure, the authentication method includes: checking first biometric information based on a physical characteristic of a user and second biometric information varying with a biological characteristic of the user; constructing a reference composite polynomial on the basis of one or more feature points respectively detected from the first and second biometric information and generating and storing security information using the reference composite polynomial; checking first and second measured biometric information of the user; constructing a detection composite polynomial on the basis of one or more feature points detected from the first and second measured biometric information and generating authentication information using the detection composite polynomial; and performing authentication of the user by comparing the security information with the authentication information.

13 Claims, 5 Drawing Sheets

(51) Int. Cl.
 *G06F 21/40* (2013.01)
 *G06K 9/62* (2006.01)

(56) References Cited

U.S. PATENT DOCUMENTS

| | | | |
|---|---|---|---|
| 2015/0088431 A1* | 3/2015 | Podhajsky | A61B 5/0059 |
| | | | 702/19 |
| 2015/0134485 A1 | 5/2015 | Kim et al. | |
| 2015/0304101 A1* | 10/2015 | Gupta | G06F 21/606 |
| | | | 380/28 |
| 2015/0371024 A1* | 12/2015 | Kim | G06F 21/35 |
| | | | 726/18 |
| 2016/0156470 A1* | 6/2016 | Rietman | H04L 9/3093 |
| | | | 380/44 |
| 2017/0053165 A1* | 2/2017 | Kaehler | G02B 27/017 |
| 2017/0317889 A1 | 11/2017 | Moon et al. | |

* cited by examiner

$$a_0 x^0 + a_1 x^1 + \cdots a_{n-1} x^{n-1} \overset{201}{\phantom{|}} \;\; +b_0 x^n + b_1 x^{n+1} + \cdots + b_m x^{n+m-1} \overset{202}{\phantom{|}}$$

$$p(x) = \sum_{i=0}^{n-1} a_i x^i + x^n \sum_{j=0}^{m-1} b_j x^j \qquad 205$$

BIOMETRIC INFORMATION-BASED AUTHENTICATION METHOD AND APPARATUS

CROSS REFERENCE TO RELATED APPLICATION

The present application claims priority to Korean Patent Application No. 10-2017-0158235 and 10-2018-0147679, filed Nov. 24, 2017 and Nov. 26, 2018 respectively, the entire contents of which is incorporated herein for all purposes by this reference.

BACKGROUND OF THE INVENTION

Field of the Invention

The present disclosure relates generally to a method and apparatus for performing user authentication. More particularly, the present disclosure relates to a method and apparatus for performing authentication using biometric information of a user.

Description of the Related Art

As information and communication technology develops, portable electronic devices, such as smart phones, smart watches, PDAs, tablet devices, and the like are widely used. Furthermore, such portable electronic devices are fundamentally configured to be equipped with a device on a network, and are configured to access or connect various other electronic devices.

The portable electronic devices or the various electronic devices connected over the network are equipped with various authentication devices for user access. The conventional authentication device performs authentication by setting an ID, a password, and the like in advance and by determining whether an ID and a password which are input in access of the user are valid or not. However, there is likelihood that the ID, the password, and the like are exposed by hacking programs and security incidents occur.

Therefore, in order to solve the problem with authentication based on the ID and the password, research on an authentication method using unique biometric information of a user has been carried out.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a biometric information-based authentication method and apparatus, in which various types of biometric information extracted from a user are used.

Also, the present disclosure is intended to propose biometric information-based authentication method and apparatus, in which invariable biometric information and variable biometric information are simultaneously used to compensate for vulnerability and security performance is great.

Also, the present disclosure is intended to propose biometric information-based authentication method and apparatus, in which a small amount of information extracted from the invariable biometric information and the variable biometric information is used to quickly and stably process security information.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to one aspect, there is provided a biometric information-based authentication method. The method includes: checking first biometric information based on a physical characteristic of a user and second biometric information varying with a biological characteristic of the user; constructing a reference composite polynomial on the basis of one or more feature points respectively detected from the first and second biometric information and generating and storing security information by using the reference composite polynomial; checking first and second measured biometric information of the user; constructing a detection composite polynomial on the basis of one or more feature points detected from the first and second measured biometric information and generating authentication information using the detection composite polynomial; and performing authentication of the user by comparing the security information with the authentication information.

According to another aspect, there is provided a biometric information-based authentication apparatus. The apparatus includes: a biometric information check unit measuring first biometric information based on a physical characteristic of a user and second biometric information varying with a biological characteristic of the user; a biometric information composition unit generating a composite polynomial on the basis of one or more feature points respectively detected from the first and second biometric information; a security information management unit generating and storing security information using the composite polynomial generated by the biometric information composition unit; an authentication information generation unit generating authentication information on the basis of the composite polynomial generated by the biometric information composition unit, in response to generation of a request for authentication; and an authentication processing unit performing authentication by comparing the security information with the authentication information.

It is to be understood that the foregoing summarized features are exemplary aspects of the following detailed description of the present disclosure without limiting the scope of the present disclosure.

According to the present disclosure, the biometric information-based authentication method and apparatus, in which various types of biometric information extracted from a user are used, are provided.

According to the present disclosure, the biometric information-based authentication method and apparatus, in which invariable biometric information and variable biometric information are simultaneously used to compensate for vulnerability and security performance is great, are provided.

According to the present disclosure, the biometric information-based authentication method and apparatus, in which a small amount of information extracted from the invariable biometric information and variable biometric information is used to quickly and stably process security information, are provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Hereinafter, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

Figure 1:
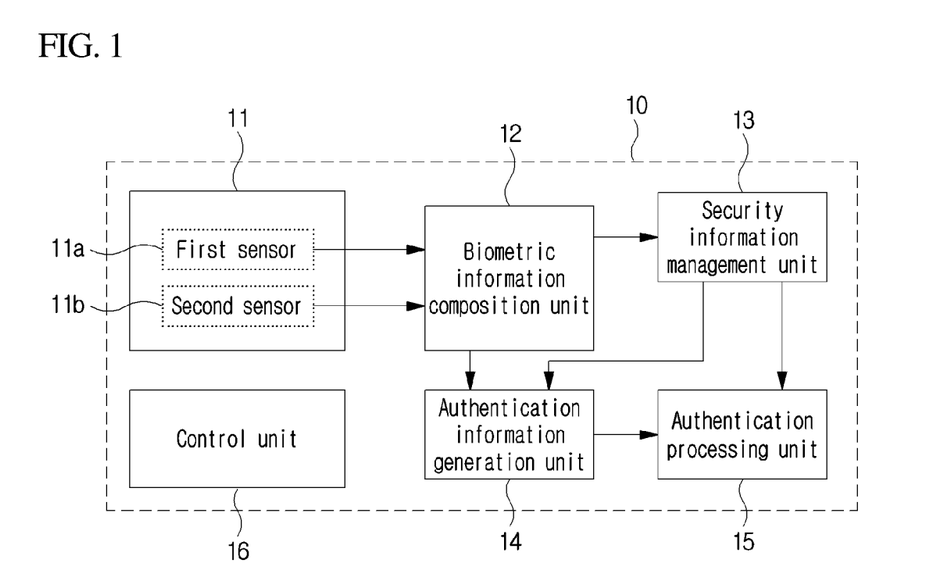
FIG. 1 is a block diagram illustrating a configuration of a biometric information-based authentication apparatus according to an embodiment of the present disclosure.

FIG. 1 is a block diagram illustrating a configuration of a biometric information-based authentication apparatus according to an embodiment of the present disclosure.

Referring to FIG. 1, according to the embodiment of the present disclosure, the biometric information-based authentication apparatus 10 may include a biometric information check unit 11, a biometric information composition unit 12, a security information management unit 13, an authentication information generation unit 14, an authentication processing unit 15, and a control unit 16.

The biometric information check unit 11 may include at least one first sensor 11a and at least one second sensor 11b that are capable of respectively detecting first biometric information based on a physical characteristic of a user and second biometric information varying with a biological characteristic of the user.

Also, the biometric information check unit 11 may provide the first and second biometric information, obtained by the at least one first and second sensors 11a and 11b, to the biometric information composition unit 12.

For example, the first sensor may be a fingerprint sensor, the first biometric information may be a biometric signal corresponding to the fingerprint of the user, the second sensor may be a pulse wave sensor, and the second biometric information may be a biometric signal corresponding to pulse waves of the user.

The biometric information composition unit 12 may check one or more feature points from the first and second biometric information obtained respectively by the at least one first and second sensors 11a and 11b, and may generate a composite polynomial on the basis of the one or more feature points.

Here, the biometric information composition unit 12 may generate, on the basis of a fuzzy vault scheme, a first polynomial based on the first biometric information and a second polynomial based on the second biometric information.

Here, the first polynomial may be a polynomial of degree n corresponding to n feature points that correspond to the first biometric information, and the second polynomial may be a polynomial of degree m corresponding to m feature points that correspond to the second biometric information. Furthermore, when the first and second polynomials include the variable terms of the same degree, the coefficients of the first and second polynomials are shared. In order to prevent this, in generation of the second polynomial, the biometric information composition unit 12 multiplies the polynomial of degree m by $x^n$ so as to construct a polynomial having variables with a relatively higher degree than the first polynomial.

Figure 2:
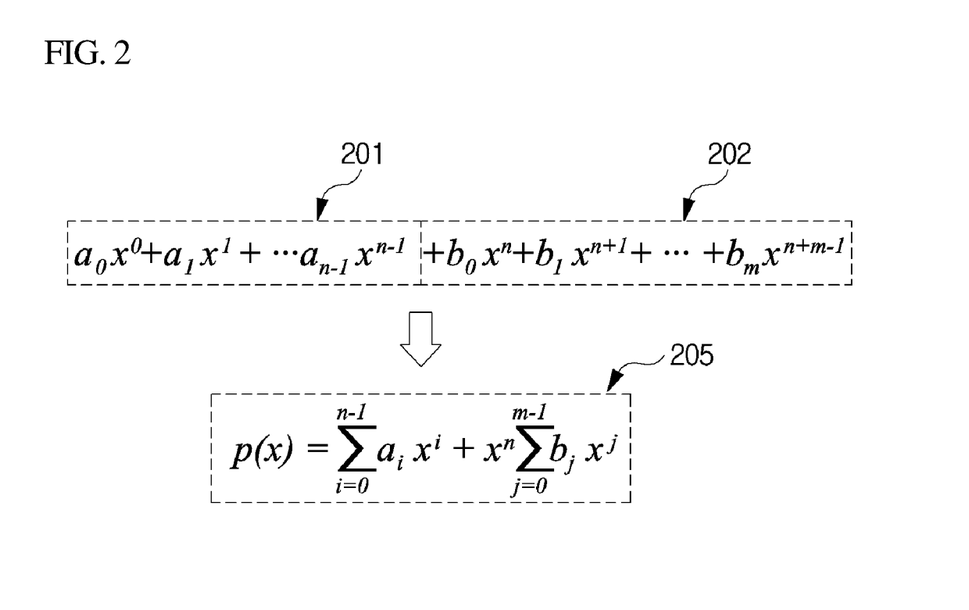
FIG. 2 is a diagram illustrating an example of a polynomial used in a biometric information-based authentication apparatus according to an embodiment of the present disclosure.

For example, the first polynomial 201, the second polynomial 202, and the composite polynomial 205 generated by the biometric information composition unit 12 may be illustrated as shown in FIG. 2.

Furthermore, the biometric information composition unit 12 may detect coefficients of the composite polynomial and may provide the detected coefficients to the security information management unit 13 or the authentication information generation unit 14.

The security information management unit 13 may generate and store the security information on the basis of the composite polynomial generated by the biometric information composition unit 12. Specifically, the security information management unit 13 may receive the coefficients of the composite polynomial from the biometric information composition unit 12, and may generate and store a security hash value by combining the coefficients of the composite polynomial.

Furthermore, the security information management unit 13 may receive, from the biometric information composition unit 12, the at least one first and second feature points detected from the first and second biometric information, and may store the at least one first and second feature points with the above-described security hash value.

Moreover, the biometric information composition unit 12 may generate at least one chaff point corresponding to the at least one first and second feature points, and may provide the at least one chaff point with the at least one first and second feature points to the security information management unit 13. Accordingly, the security information management unit 13 may store the at least one first and second feature points with the at least one chaff point.

Also, the biometric information composition unit 12 may provide the at least one first and second feature points, the at least one chaff point, and the like. For example, when the control unit 16 requests the at least one first and second feature points and the at least one chaff point to be provided, the at least one first and second feature points and the at least one chaff point are provided to the biometric information composition unit 12.

The authentication information generation unit 14 may operate as user authentication is requested, and may make a request to the biometric information composition unit 12 for the coefficients of the composite polynomial. In response to this, the biometric information composition unit 12 may check the one or more feature points from the first and second biometric information obtained by the biometric information check unit 11, and may generate the composite polynomial on the basis of the one or more feature points. Also, the biometric information composition unit 12 may detect the coefficients of the composite polynomial and may provide the detected coefficients to the authentication information generation unit 14. Accordingly, the authentication information generation unit 14 may generate and store an authentication hash value by combining the coefficients of the composite polynomial.

Furthermore, the biometric information composition unit 12 may generate the composite polynomial using the at least one first and second chaff points. Specifically, when the biometric information composition unit 12 receives a request for the coefficients of the composite polynomial from the authentication information generation unit 14, the one or more feature points are checked from the first and second biometric information obtained by the biometric information check unit 11. Furthermore, the biometric information check unit 11 may select, from at least one first and second pre-stored feature points and at least one pre-stored chaff point, one or more feature points corresponding to the one or more detected feature points. Accordingly, the biometric information check unit 11 may generate the composite polynomial on the basis of the one or more selected feature points, and may detect the coefficients of the composite polynomial to provide the results to the authentication information generation unit 14. Furthermore, the authentication information generation unit 14 may generate and store the authentication hash value by combining the coefficients of the composite polynomial.

The authentication processing unit 15 may receive the security hash value from the security information management unit 13 and may receive the authentication hash value from the authentication information generation unit 14. Also, the authentication processing unit 15 may process user authentication by comparing the security hash value with the authentication hash value.

In the meantime, the control unit 16 may control operation of constituents of the biometric information-based authentication apparatus 10 according to the embodiment of the present disclosure. For example, the control unit 16 may check whether setting of the security information is requested via a user interface of the biometric information-based authentication apparatus 10. When setting of the security information is requested, the control unit 16 controls operation of the biometric information check unit 11, the biometric information composition unit 12, the security information management unit 13, and the like.

Also, the control unit 16 may check whether user authentication is requested via the user interface of the biometric information-based authentication apparatus 10. When user authentication is requested, the control unit 16 controls operation of the biometric information check unit 11, the biometric information composition unit 12, the security information management unit 13, the authentication information generation unit 14, the authentication processing unit 15, and the like.

The detailed operation of the control unit 16 will be described later in detail with the biometric information-based authentication method according to the embodiment of the present disclosure.

Figure 3:
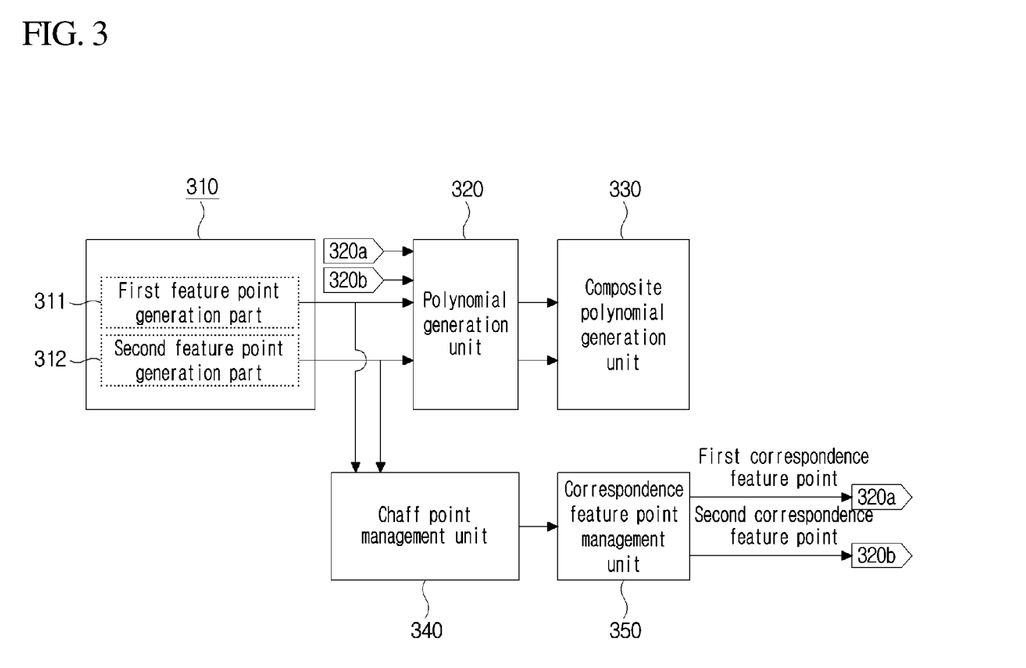
FIG. 3 is a block diagram illustrating a detailed configuration of a biometric information composition unit of a biometric information-based authentication apparatus according to an embodiment of the present disclosure.

FIG. 3 is a block diagram illustrating a detailed configuration of a biometric information composition unit of a biometric information-based authentication apparatus according to an embodiment of the present disclosure.

Referring to FIG. 3, the biometric information composition unit 300 may include a feature point generation unit 310, a polynomial generation unit 320, and a composite polynomial generation unit 330.

The feature point generation unit 310 may include a first feature point generation part 311 and a second feature point generation part 312. The first feature point generation part 311 may check the first biometric information provided from the outside or the first sensor 11a shown in FIG. 1, and may detect the at least one first feature point from the first biometric information. Similarly, the second feature point generation part 312 may check the second biometric information from the outside or the second sensor 11b shown in FIG. 1, and may detect the at least one second feature point from the second biometric information.

The feature point generation unit 310 may store the first feature point and the second feature point, and may provide the first feature point and the second feature point to the polynomial generation unit 320. The polynomial generation unit 320 may generate, on the basis of the fuzzy vault scheme, the first polynomial 201 (referring to FIG. 2) based on the first feature point and the second polynomial 202 based on the second feature point.

Here, the first polynomial 201 may be the polynomial of degree n corresponding to n feature points that correspond to the first biometric information, and the second polynomial 202 may be the polynomial of degree m corresponding to m feature points that correspond to the second biometric information. When the first and second polynomials 201 and 202 include the variable terms of the same degree, the coefficients of the first and second polynomials 201 and 202 are shared. Considering this, in generation of the second polynomial 202, the polynomial generation unit 320 multiplies the polynomial of degree m by $x^n$ so as to construct the polynomial having variables with a relatively higher degree than the first polynomial 201.

The polynomial generation unit 320 may provide the generated first and second polynomials 201 and 202 to the composite polynomial generation unit 330, and the composite polynomial generation unit 330 may generate the composite polynomial 205 by combining the first and second polynomials 201 and 202.

Furthermore, the biometric information composition unit 300 may further include a chaff point management unit 340 and a correspondence feature point management unit 350.

The chaff point management unit 340 may generate the at least one chaff point corresponding to the at least one first and second feature points, and may provide the generated chaff point with the at least one first and second feature points to the security information management unit 13. Here, the at least one chaff point generated by the chaff point management unit 340 may include a first chaff point corresponding to the at least one first feature point and a second chaff point corresponding to the at least one second feature point.

Furthermore, the chaff point management unit 340 may check that user authentication is requested, may check at least one first and second feature points which are pre-stored in the security information management unit 13 and at least one chaff point corresponding thereto, and may provide the checked information (the at least one first and second pre-stored feature points and the at least one chaff point corresponding thereto) to the correspondence feature point management unit 350. Accordingly, the correspondence feature point management unit 350 may check the at least one first and second feature points generated by the feature point generation unit 310 and the information (the at least one first and second pre-stored feature points and the at least one chaff point corresponding thereto) received from the chaff point management unit 340. Also, the correspondence feature point management unit 350 may select, from information (the at least one first and second pre-stored feature points and the at least one chaff point corresponding thereto) received from the chaff point management unit 340, at least one first correspondence feature point having a characteristic the most similar to that of the at least one first generated feature point. Similarly, the correspondence feature point management unit 350 may select, from the information (the at least one first and second pre-stored feature points and the at least one chaff point corresponding thereto) received from the chaff point management unit 340, at least one second correspondence feature point having a characteristic the most similar to that of the at least one second generated feature point.

Also, the correspondence feature point management unit 350 may provide the at least one first and second correspondence feature points to the polynomial generation unit 320. The polynomial generation unit 320 may generate the first and second polynomials using the at least one first and second correspondence feature points and may provide the generated first and second polynomials to the composite polynomial generation unit 330. The composite polynomial generation unit 330 may generate the composite polynomial 205 by combining the first and second polynomials 201 and 202.

Figure 4:
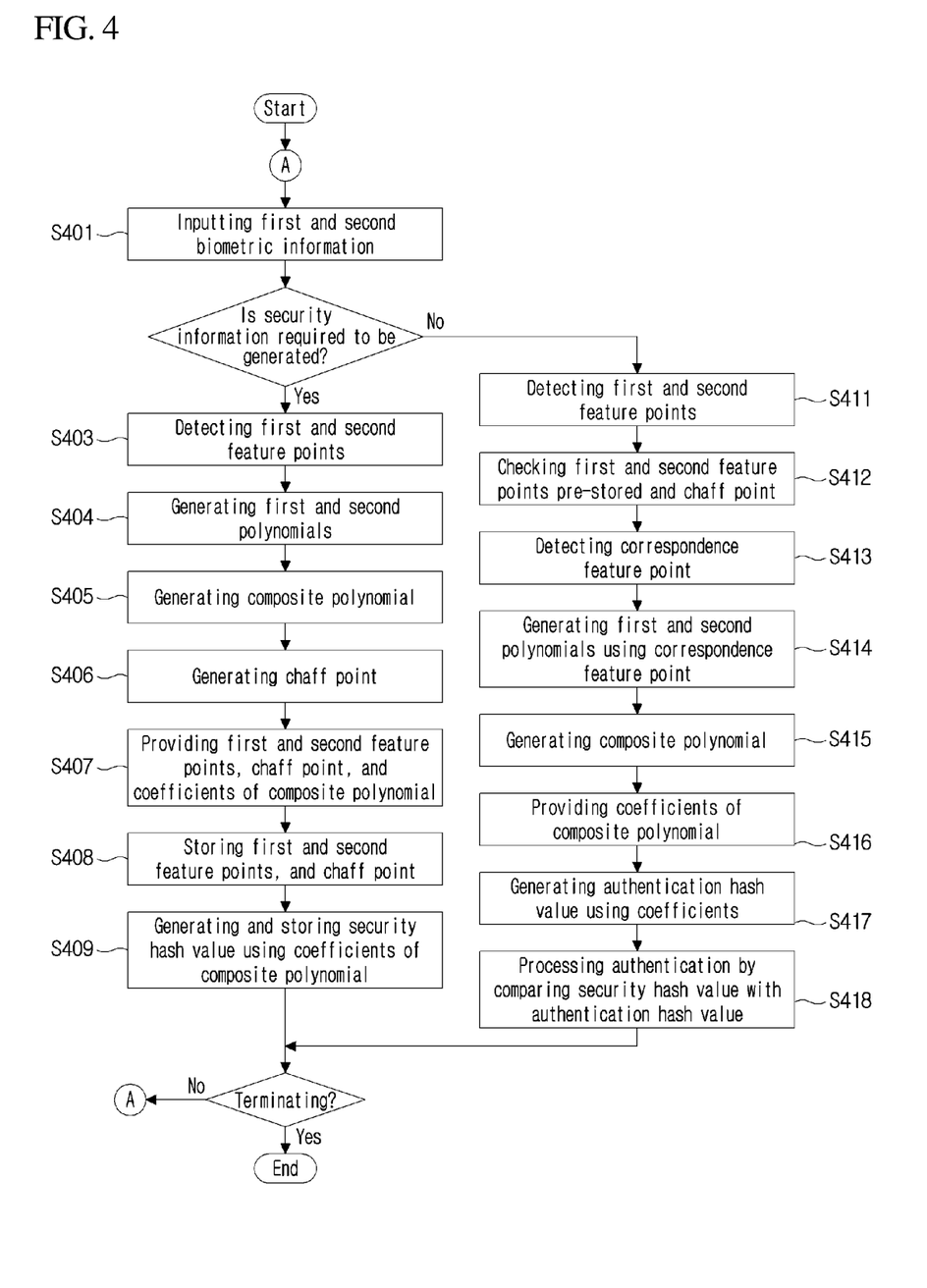
FIG. 4 is a flowchart illustrating a sequence of a biometric information-based authentication method according to an embodiment of the present disclosure.

FIG. 4 is a flowchart illustrating a sequence of a biometric information-based authentication method according to an embodiment of the present disclosure.

First, the biometric information-based authentication method according to the embodiment of the present disclosure may be performed by the biometric information-based authentication apparatus according to the embodiment of the present disclosure.

At step S401, the biometric information-based authentication apparatus may sense input of the first and second biometric information through the sensors detecting the first and second biometric information, and the like. Also, the biometric information-based authentication apparatus may detect the first and second biometric information via the corresponding sensors.

For example, the first biometric information may be biometric information based on the physical characteristic of the user and may contain fingerprint information, and the second biometric information may be biometric information varying with the biological characteristic of the user and may be a biometric signal corresponding to pulse waves of the user. Accordingly, at step S401, the biometric information-based authentication apparatus may detect and store the first and second biometric information for a predetermined time (for example, 10 seconds, one minute, or the like).

At step S402, the biometric information-based authentication apparatus may check whether the security information is generated. For example, the biometric information-based authentication apparatus may check whether the security information is pre-stored therein. When the security information is not pre-stored therein, the biometric information-based authentication apparatus checks that generation of the security information is required. As another example, the biometric information-based authentication apparatus may provide a menu for requesting generation of the security information. When the menu for requesting generation of the security information is selected by the user, the biometric information-based authentication apparatus checks that generation of the security information is requested.

When generation of the security information is requested at step S402-Yes, the biometric information-based authentication apparatus detects the first feature point and the second feature point from the first and second biometric information at step S403.

Next, the biometric information-based authentication apparatus generates the first polynomial based on the first feature point and the second polynomial based on the second feature point at step S404.

Here, the first polynomial may be a polynomial of degree n corresponding to n feature points that correspond to the first biometric information, and the second polynomial may be a polynomial of degree m corresponding to m feature points that correspond to the second biometric information. Furthermore, when the first and second polynomials include the variable terms of the same degree, the coefficients of the first and second polynomials are shared. In order to prevent this, in generation of the second polynomial, the biometric information-based authentication apparatus multiplies the polynomial of degree m by $x^n$ so as to construct the polynomial having the variables with a relatively higher degree than the first polynomial.

When generation of the first and second polynomials is completed, the biometric information-based authentication apparatus generates the composite polynomial by combining the first and second polynomials at step S405.

For example, the first polynomial 201, the second polynomial 202, and the composite polynomial 205 generated by the biometric information-based authentication apparatus may be illustrated as shown in FIG. 2.

Next, at step S409, the biometric information-based authentication apparatus may detect the coefficients of the composite polynomial and may generate and store the security information on the basis thereof. Specifically, the biometric information-based authentication apparatus may check the coefficients of the composite polynomial, and may generate and store the security hash value by combining the coefficients of the composite polynomial.

Here, the biometric information-based authentication apparatus may store the at least one first and second feature points detected from the first and second biometric information with the security hash value.

Although, in the embodiment of the present disclosure, illustrated is that the biometric information-based authentication apparatus stores the at least one first and second feature points with the security hash value, the present disclosure is not limited thereto and variously modified.

As another example, the biometric information-based authentication apparatus may generate the at least one chaff point corresponding to the at least one first and second feature points at step S406, and may provide the at least one chaff point with the at least one first and second feature points at step S407. Accordingly, the biometric information-based authentication apparatus may store the at least first and second feature points with the at least one chaff point at step S408.

In the meantime, at step S402, when generation of the security information is not requested at step S402-No, the biometric information-based authentication apparatus may perform an authentication operation using the first and second biometric information.

At step S411, the biometric information-based authentication apparatus may respectively detect the first feature point and the second feature point from the first and second biometric information. Also, the biometric information-based authentication apparatus may generate the first polynomial based on the first feature point and the second polynomial based on the second feature point at step S414. As described above, the first polynomial may be a polynomial of degree n corresponding to n feature points that correspond to the first biometric information, and the second polynomial may be a polynomial of degree m corresponding to m feature points that correspond to the second biometric information. Also, in generation of the second polynomial, the biometric information-based authentication apparatus multiplies the polynomial of degree m by $x^n$ so as to construct the polynomial having the variables with a relatively higher degree than the first polynomial.

As described above, when generation of the first and second polynomials is completed, the biometric information-based authentication apparatus generates the composite polynomial by combining the first and second polynomials at step S415.

Although, in the embodiment of the present disclosure, illustrated is that the biometric information-based authentication apparatus checks the first and second measured biometric information, detects the at least one first and second feature points therefrom, and generates the first and second polynomials using the at least one first and second detected feature points, but the present disclosure is not limited thereto and variously modified.

As another example, the biometric information-based authentication apparatus may generate the first and second polynomials using the at least one first and second feature points stored with the security information. In storage of the security information, the biometric information-based authentication apparatus may store the at least first and second feature points with the at least one chaff point corresponding thereto. In processing of the authentication operation, the biometric information-based authentication apparatus may generate the first and second polynomials using the at least one first and second pre-stored feature points and the at least one pre-stored chaff point.

Specifically, the biometric information-based authentication apparatus may check the at least one first and second feature points pre-stored as the security information (hereinafter, referred to as "a stored first feature point" and "a stored second feature point"), the at least one chaff point, and the like at step S412.

Next, at step S413, the biometric information-based authentication apparatus may check the one or more feature points (hereinafter, referred to as "a first measured feature point" and "a second measured feature point") from the first and second biometric information measured at step S411, and may select a feature point corresponding to the at least one first and second measured feature points from the first stored feature point, the second stored feature point, and the at least one pre-stored chaff point.

Accordingly, at steps S414 and S415, the biometric information-based authentication apparatus may generate the first and second polynomials on the basis of the one or more selected feature points as described above, and may generate the composite polynomial by combining the first and second polynomials.

At step S416, the biometric information-based authentication apparatus may check the composite polynomial generated at step S415 and may check and provide the coefficients of the composite polynomial. Next, at step S417, the biometric information-based authentication apparatus may generate the authentication hash value by combining the checked coefficients.

After, at step S418, the biometric information-based authentication apparatus may compare the security hash value with the authentication hash value to check whether these two types of information are matched for processing authentication.

Steps S401 to S418 may be repeatedly performed until the biometric information-based authentication apparatus terminates.

Figure 5:
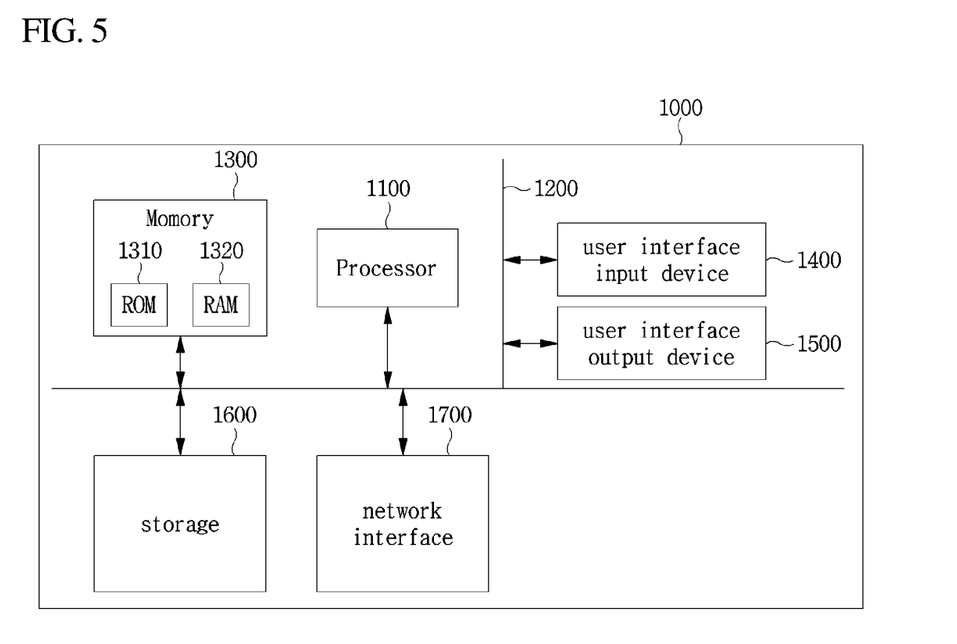
FIG. 5 is a block diagram illustrating an example of a computing system that executes the biometric information-based authentication method and apparatus according to an embodiment of the present disclosure.

FIG. 5 is a block diagram illustrating an example of a computing system that executes the biometric information-based authentication method and apparatus according to an embodiment of the present disclosure.

Referring to FIG. 5, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or nonvolatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A biometric information-based authentication method, the method comprising:
   measuring first biometric information based on a physical characteristic of a user and second biometric information varying with a biological characteristic of the user;
   generating a reference composite polynomial on the basis of one or more feature points respectively detected from the first and second biometric information and generating and storing security information on the basis of the reference composite polynomial;
   checking first and second measured biometric information of the user;
   constructing a detection composite polynomial on the basis of one or more feature points detected from the first and second measured biometric information and, in response to generation of a request for authentication, generating authentication information using the detection composite polynomial; and
   performing authentication of the user by comparing the security information with the authentication information;
   wherein the generating and storing of the security information comprises:
   constructing a first polynomial based on the first biometric information;
   constructing a second polynomial based on the second biometric information by taking a degree of a variable of the first polynomial into consideration; and
   generating the reference composite polynomial including the first and second polynomials;
   wherein the generating and storing of the security information comprises:
   detecting at least one first feature point from the first biometric information;
   detecting at least one second feature point from the second biometric information; and
   managing the at least one first and second feature points; and
   wherein the generating and storing of the security information comprises:
   generating at least one first chaff point corresponding to the at least one first feature point;
   generating at least one second chaff point corresponding to the at least one second feature point; and
   storing the at least one first and second chaff points.

2. The authentication method of claim 1, wherein the generating of the authentication information comprises:
   checking at least one first detection feature point detected from the first measured biometric information;
   checking at least one second detection feature point detected from the second measured biometric information;
   checking, from the at least one first and second feature points, the at least one first and second feature points being pre-stored, and the at least one first and second chaff points, at least one first correspondence feature point corresponding to the at least one first detection feature point and at least one second correspondence feature point corresponding to the at least one second detection feature point; and
   constructing the detection composite polynomial using the at least one first and second correspondence feature points.

3. The authentication method of claim 1, wherein the second biometric information comprises information regarding a pattern in which vascular volume that varies with the biological characteristic of the user is detected for a predetermined time.

4. The authentication method of claim 1, wherein the reference composite polynomial and the detection composite polynomial are fuzzy vault-based polynomials.

5. The authentication method of claim 1, wherein the generating and storing of the security information comprises:
   checking coefficients of the reference composite polynomial; and
   generating a hash value by combining the checked coefficients of the reference composite polynomial.

6. The authentication method of claim 5, wherein the generating of the authentication information comprises:

checking coefficients of the detection composite polynomial; and generating a hash value by combining the checked coefficients of the detection composite polynomial.

7. A biometric information-based authentication apparatus, the authentication apparatus comprising at least one processor configured to execute operations to implement the following units:

a biometric information check unit measuring first biometric information based on a physical characteristic of a user and second biometric information varying with a biological characteristic of the user;

a biometric information composition unit generating a composite polynomial on the basis of one or more feature points respectively detected from the first and second biometric information;

a security information management unit generating and storing security information on the basis of the composite polynomial generated by the biometric information composition unit;

an authentication information generation unit generating authentication information on the basis of the composite polynomial generated by the biometric information composition unit, in response to generation of a request for authentication; and an authentication processing unit performing authentication by comparing the security information with the authentication information;

wherein the biometric information composition unit comprises a polynomial generation unit configured to:

construct a first polynomial based on the first biometric information;

construct a second polynomial based on the second biometric information by taking a degree of a variable of the first polynomial into consideration; and generate the composite polynomial including the first and second polynomials;

wherein the second biometric information comprises information regarding a pattern in which vascular volume that varies with the biological characteristic of the user is detected for a predetermined time.

8. The authentication apparatus of claim 7, wherein the biometric information composition unit comprises a feature point management unit configured to:

detect at least one first feature point from the first biometric information;

detect at least one second feature point from the second biometric information; and manage the at least one first and second feature points.

9. The authentication apparatus of claim 8, wherein the feature point management unit comprises a chaff point management unit configured to:

generate at least one first chaff point corresponding to the at least one first feature point;

generate at least one second chaff point corresponding to the at least one second feature point; and store the at least one first and second chaff points.

10. The authentication apparatus of claim 9, wherein the authentication information generation unit requests the biometric information composition unit for generation of the composite polynomial, and the biometric information composition unit is configured to:

check at least one first detection feature point detected from the first measured biometric information;

check at least one second detection feature point detected from the second measured biometric information;

check, from the at least one first and second feature points, the at least one first and second feature points being pre-stored, and the at least one first and second chaff points, at least one first correspondence feature point corresponding to the at least one first detection feature point and at least one second correspondence feature point corresponding to the at least one second detection feature point; and construct the composite polynomial using the at least one first and second correspondence feature points.

11. A biometric information-based authentication apparatus, the authentication apparatus comprising at least one processor configured to execute operations to implement the following units:

a biometric information check unit measuring first biometric information based on a physical characteristic of a user and second biometric information varying with a biological characteristic of the user;

a biometric information composition unit generating a composite polynomial on the basis of one or more feature points respectively detected from the first and second biometric information;

a security information management unit generating and storing security information on the basis of the composite polynomial generated by the biometric information composition unit;

an authentication information generation unit generating authentication information on the basis of the composite polynomial generated by the biometric information composition unit, in response to generation of a request for authentication; and an authentication processing unit performing authentication by comparing the security information with the authentication information;

wherein the biometric information composition unit comprises a polynomial generation unit configured to:

construct a first polynomial based on the first biometric information;

construct a second polynomial based on the second biometric information by taking a degree of a variable of the first polynomial into consideration; and generate the composite polynomial including the first and second polynomials; and wherein the composite polynomial is fuzzy vault-based polynomials.

12. The authentication apparatus of claim 7, wherein the security information management unit checks coefficients of the composite polynomial and generates a hash value by combining the checked coefficients of the composite polynomial.

13. The authentication apparatus of claim 12, wherein the authentication information generation unit checks coefficients of the composite polynomial and generates a hash value by combining the checked coefficients of the composite polynomial.

* * * * *